(12) United States Patent
Moriyoshi

(10) Patent No.: US 12,392,988 B2
(45) Date of Patent: Aug. 19, 2025

(54) LENS OPERATION APPARATUS

(71) Applicant: CANON KABUSHIKI KAISHA, Tokyo (JP)

(72) Inventor: Akino Moriyoshi, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 493 days.

(21) Appl. No.: 18/045,272

(22) Filed: Oct. 10, 2022

(65) Prior Publication Data

US 2023/0111735 A1 Apr. 13, 2023

(30) Foreign Application Priority Data

Oct. 12, 2021 (JP) .................................. 2021-167598

(51) Int. Cl.
*G02B 7/10* (2021.01)
*G02B 7/02* (2021.01)
*H04N 23/55* (2023.01)

(52) U.S. Cl.
CPC ............... *G02B 7/10* (2013.01); *G02B 7/021* (2013.01); *H04N 23/55* (2023.01)

(58) Field of Classification Search
CPC ... G02B 7/02; G02B 7/04; G02B 7/10; G02B 7/021; G03B 2205/0053; G03B 2205/0046
USPC ........................................................ 359/823
See application file for complete search history.

(56) References Cited

U.S. PATENT DOCUMENTS

| | | | | |
|---|---|---|---|---|
| 5,115,348 A | * | 5/1992 | Notagashira | G02B 7/10 396/85 |
| 5,724,616 A | * | 3/1998 | Imafuji | G03B 5/00 348/208.11 |
| 2002/0135903 A1 | * | 9/2002 | Nomura | G02B 7/10 359/823 |
| 2009/0153985 A1 | * | 6/2009 | Nagaoka | G02B 7/1805 359/733 |
| 2013/0016272 A1 | * | 1/2013 | Ichikawa | G03B 19/12 348/335 |
| 2013/0222926 A1 | * | 8/2013 | Kawada | G03B 3/10 359/696 |

(Continued)

FOREIGN PATENT DOCUMENTS

| | | |
|---|---|---|
| JP | 661173227 A | 8/1986 |
| JP | H0511163 A | 1/1993 |

(Continued)

*Primary Examiner* — Wyatt A Stoffa
*Assistant Examiner* — Seth D Moser
(74) *Attorney, Agent, or Firm* — Canon U.S.A., Inc. IP Division

(57) ABSTRACT

An apparatus includes an operation ring including first and second tooth portions, a first unit including an emitting portion that emits light to the first tooth portion and a receiving portion that receives emitted light passing through slits of the first tooth portion, and a second unit including an emitting portion that emits light to the second tooth portion and a receiving portion that receives emitted light passing through slits of the second tooth portion. Rotation of the ring is detected based on detection results by the first and second units. The ring has grooves formed at a first period in a circumferential direction thereof, and between the first and second tooth portions in a direction parallel to a rotation axis of the ring. The apparatus further includes a sliding member that is biased in a radial direction of the ring and slides over the grooves as the ring rotates.

9 Claims, 10 Drawing Sheets

(56) References Cited

U.S. PATENT DOCUMENTS

| | | | |
|---|---|---|---|
| 2017/0205699 A1* | 7/2017 | Okubo | G03B 21/204 |
| 2017/0235090 A1* | 8/2017 | Takeshita | G03B 17/14 |
| | | | 348/345 |
| 2020/0026024 A1* | 1/2020 | Asano | G02B 7/026 |
| 2025/0102888 A1* | 3/2025 | Uemura | G03B 17/14 |
| 2025/0110313 A1* | 4/2025 | Kondo | G02B 15/14 |

FOREIGN PATENT DOCUMENTS

| | | |
|---|---|---|
| JP | 5166597 B1 | 3/2013 |
| JP | 2016224294 A | 12/2016 |
| JP | 2019120814 A | 7/2019 |
| JP | 2020013029 A | 1/2020 |
| JP | 2020013030 A | 1/2020 |
| JP | 2020052392 A | 4/2020 |

\* cited by examiner

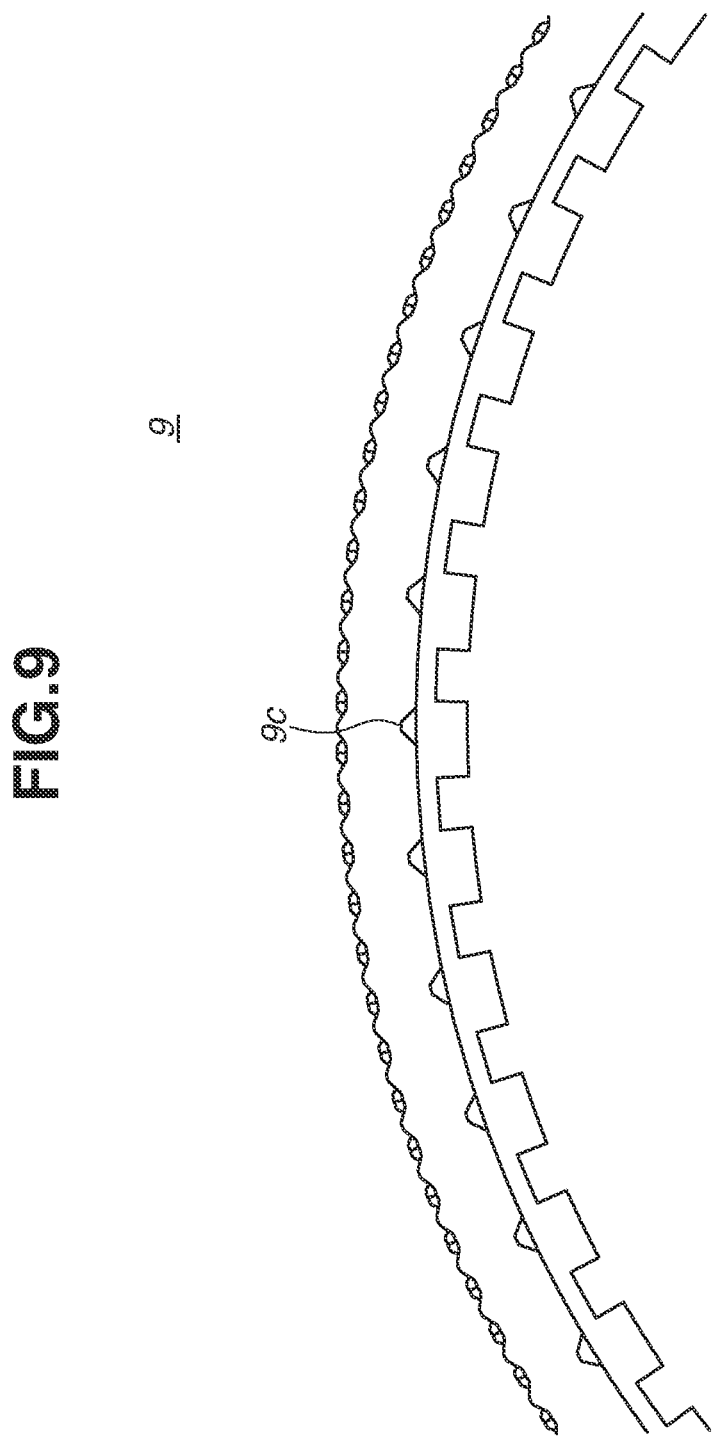

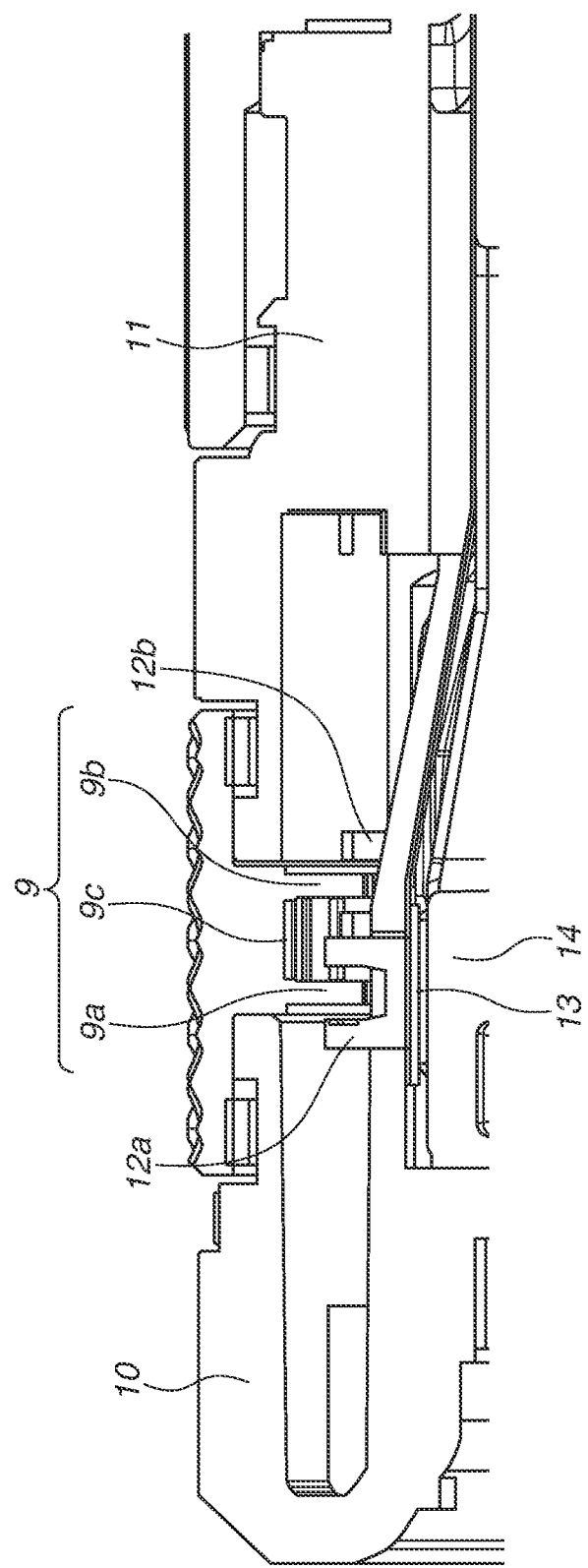

LENS OPERATION APPARATUS

BACKGROUND

Field of the Disclosure

The present disclosure relates to an apparatus including an operation ring.

Description of the Related Art

Conventionally, lens apparatuses including a click mechanism for giving a click feel at predetermined angles when an operation ring is rotationally operated have been known. In a case where the operation ring of a lens apparatus is an aperture ring for operating an aperture, an operator can quickly operate the aperture to obtain an intended aperture value since the operator can feel a predetermined number of aperture steps via the operation ring because of the click mechanism.

For example, Japanese Patent Application Laid-Open No. 61-173227 discusses a click mechanism of a lens apparatus, where a plurality of click grooves is formed at predetermined distances in a circumferential direction in an inner circumferential surface of an aperture ring, and a click ball pressed by a plate spring is disposed on an outer circumferential surface of a fixed ring. The lens apparatus discussed in Japanese Patent Application Laid-Open No. 61-173227 enables an operator to set a specified aperture value at each locking position by operating the aperture ring during imaging.

Japanese Patent No. 5166597 discusses an aperture apparatus including an engaging body elastically supported by one of a fixed barrel portion or an aperture ring, and an engaged surface on the other. The engaged surface has a plurality of engaged portions with which the engaging body can be engaged at positions corresponding to aperture values when the aperture ring is rotated.

To configure an operation ring capable of endless rotation using the click mechanism discussed in Japanese Patent Application Laid-Open No. 61-173227 or Japanese Patent No. 5166597, a plurality of click grooves is to be provided over the entire area in the circumferential direction. In addition, the rotation over the entire area in the circumference direction is to be detected at a position different from where the click grooves are provided in the rotation axis direction.

A rotation detection apparatus using a tooth pattern and photointerrupters has been known.

The rotation detection apparatus detects the amount and direction of rotation of the operation ring, using two photointerrupters disposed at a predetermined distance in the circumferential direction with respect to a tooth pattern including light shielding portions and slits periodically provided on the inner periphery of the operation ring. Moreover, the rotation detection apparatus is to include a synchronization tooth pattern including slits provided in the circumferential direction at the same period as that of the click grooves in order to synchronize the click mechanism with a rotation detection signal of the rotation detection apparatus for the operation ring.

SUMMARY

According to as aspect of the present disclosure, an apparatus includes an operation ring including a first tooth portion where light shielding portions and slits are both arranged at a first period and a second tooth portion where light shielding portions and slits are both arranged at a second period different from the first period, a first detection unit including a light emitting portion configured to emit light to the first tooth portion and a light receiving portion configured to receive light emitted from the light emitting portion and having passed through the slits of the first tooth portion, and a second detection unit including a light emitting portion configured to emit light to the second tooth portion and a light receiving portion configured to receive light emitted from the light emitting portion and having passed through the slits of the second tooth portion. Rotation of the operation ring is detected based on a result of detection by the first detection unit and a result of detection by the second detection unit. The operation ring has grooves formed at the first period in a circumferential direction of the operation ring, and the grooves are formed between the first tooth portion and the second tooth portion in a direction parallel to a rotation axis of the operation ring. The apparatus further comprises a sliding member configured to be biased in a radial direction of the operation ring and slide over the grooves as the operation ring rotates.

Further features of the present disclosure will become apparent from the following description of exemplary embodiments with reference to the attached drawings.

BRIEF DESCRIPTION OF THE DRAWINGS

FIG. 9 is a view of click grooves in the operation ring seen from the imaging side, according to one or more embodiment of the subject disclosure.

FIG. 10 is a sectional view illustrating a configuration of an operation ring according to a second exemplary embodiment of the subject disclosure.

DESCRIPTION OF THE EMBODIMENTS

Figure 1:
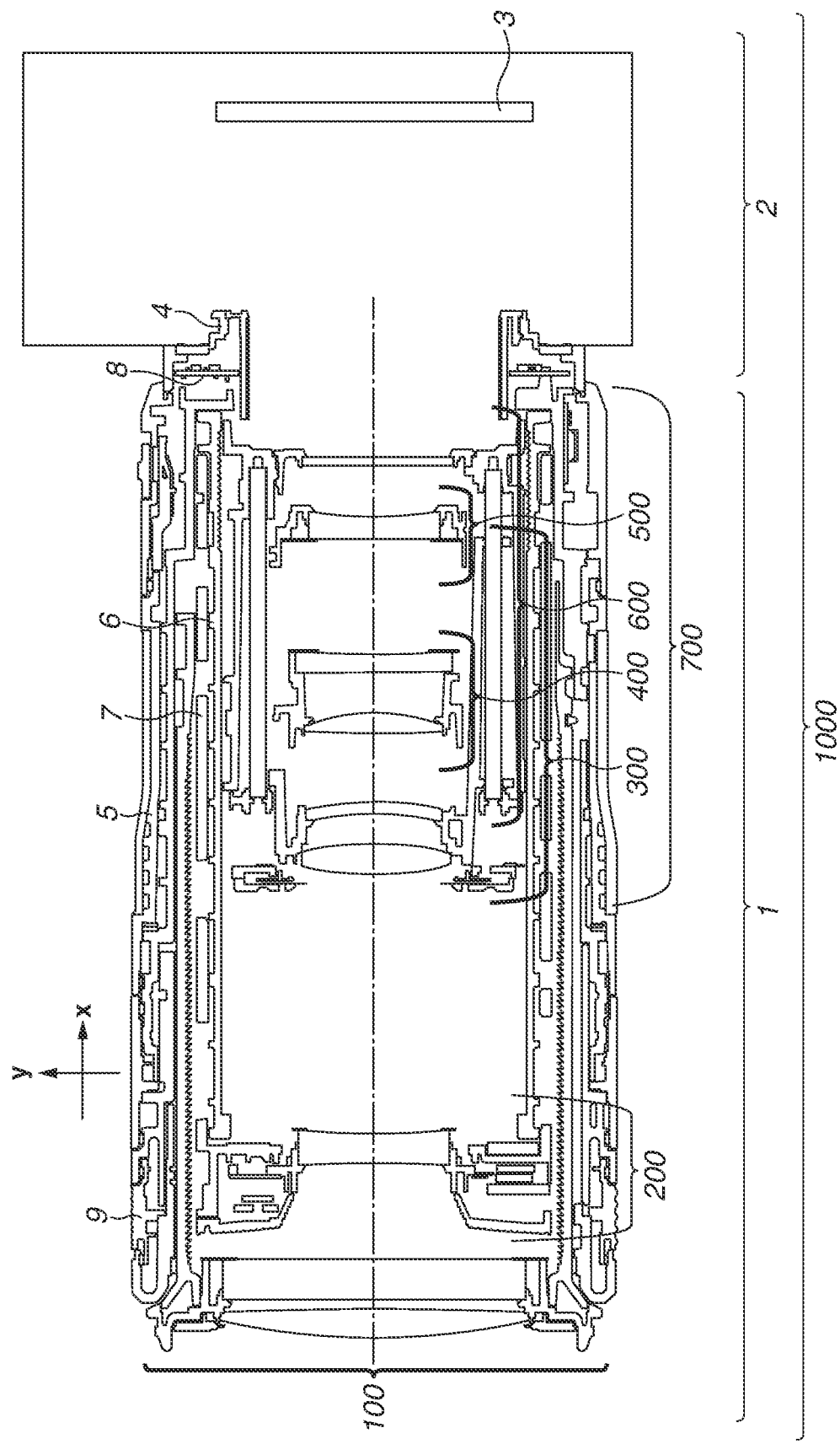
FIG. 1 is a view illustrating a configuration of a lens apparatus and a camera main body, according to one or more embodiment of the subject disclosure.

Exemplary embodiments of the present disclosure will be described in detail below with reference to the attached drawings. In the drawings, the same members are denoted by the same reference numerals. A redundant description thereof will be omitted.

Configuration of Lens Apparatus

FIG. 1 is a schematic diagram illustrating an imaging apparatus 1000 in which a lens apparatus 1 (a lens barrel) is attached to a camera 2 (a camera main body). The lens apparatus 1 includes an apparatus including an operation ring 9 according to a first exemplary embodiment of the present disclosure. The camera 2 (the camera main body) includes an image sensor 3 such as a charge-coupled device (CCD) sensor or a complementary metal-oxide-semiconductor (CMOS) sensor, and is configured to capture an image formed through the lens apparatus 1. The lens apparatus 1 includes a mount 4, and is detachably attached to the camera 2 including a mount (not illustrated).

The imaging apparatus 1000 according to the present exemplary embodiment is not limited to an imaging system, and examples thereof include an interchangeable-lens camera and an integral-lens camera. Examples of the camera 2 include imaging apparatuses such as a digital still camera and a video camera.

The lens apparatus 1 includes lenses or optical elements arranged in order from an object (−X direction) side. The lens apparatus 1 includes an imaging optical system including a first lens unit 100, a second lens unit 200, a third lens unit 300, a fourth lens unit 400, a fifth lens unit 500, and a sixth lens unit 600 arranged in order from the object side. The imaging optical system forms an object image on the image sensor 3 of the camera 2 by focusing light from an object (not illustrated). Rotating a manual zoom ring 5 changes the positional relationship between the respective lens units in the optical axis direction, whereby a focal length of the lens apparatus 1 is changed.

The first lens unit 100 includes a first lens cam follower (not illustrated). When the manual zoom ring 5 is rotated, a cam barrel 7 having a cam groove oblique to the optical axis rotates to move the first lens unit 100 straight in the optical axis direction. The first lens cam follower is engaged with the cam groove in the cam barrel 7 and a straight groove parallel to the optical axis in a guide barrel 6. Rotation of the cam barrel 7 changes the position of the first lens cam follower in the optical axis direction. The guide barrel 6 is configured to not move in the optical axis direction with respect to the mount 4, and disposed in a bore of the cam barrel 7.

The second lens unit 200 is an optical image stabilization unit. The second lens unit 200 is configured so that the optical element is moved in a direction orthogonal to the optical axis by a main central processing unit (CPU) 8 (a control unit) based on shake information about the lens apparatus 1 obtained by a gyro sensor (not illustrated).

The fifth lens unit 500 is a focusing unit, and is moved in the optical axis direction by an actuator (not illustrated) to be described below. Driving of the actuator (not illustrated) is controlled by the main CPU 8.

A configuration of the operation ring 9 will be described in detail below. The operation ring 9 is capable of endless rotation about the optical axis while remaining at a fixed position. The operation ring 9 includes a rotation detection unit inside thereof, and the main CPU 8 controls driving of a predetermined mechanism in the lens apparatus 1 based on the amount and direction of rotation of the operation ring 9. The main CPU 8 performs the foregoing control by communicating with a main CPU (not illustrated) disposed in the camera 2.

Figure 2:
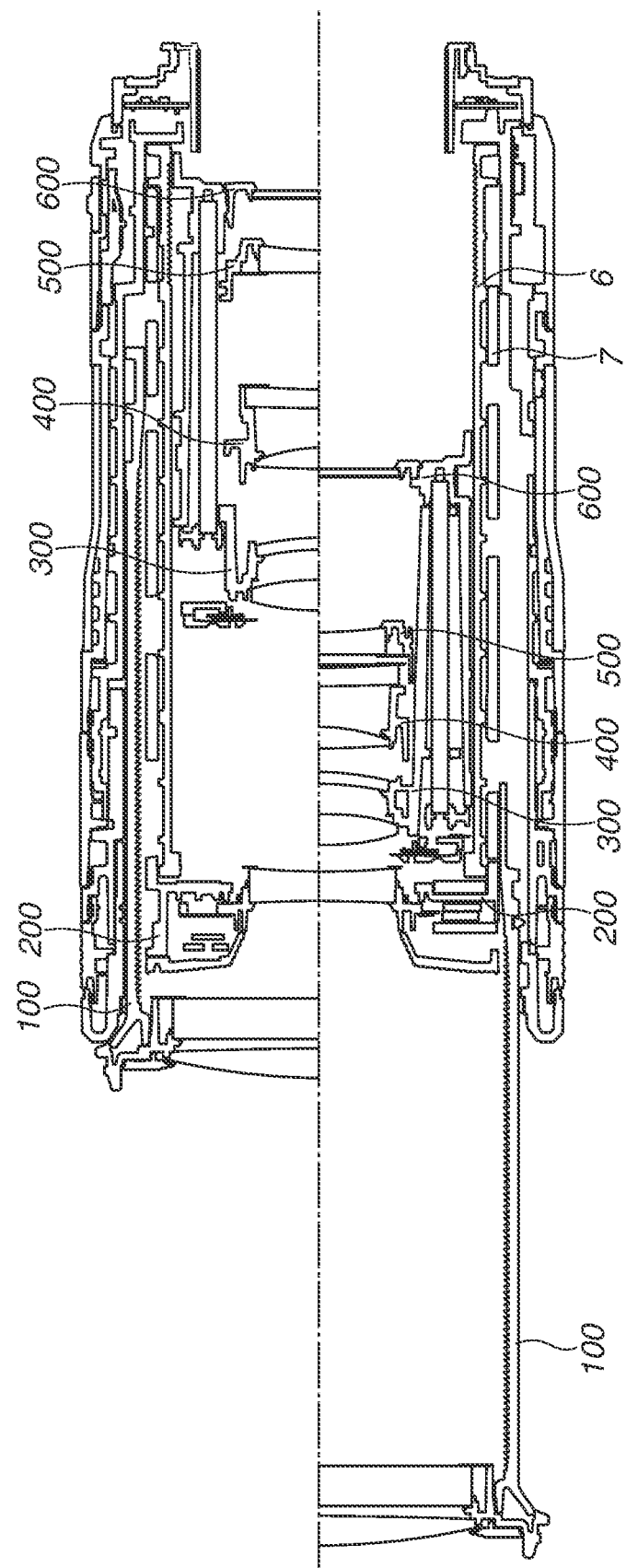
FIG. 2 is a sectional view of the lens apparatus in a wide state and a tele state, according to one or more embodiment of the subject disclosure.

The upper part of FIG. 2 is a sectional view illustrating the positions of the lens units in a wide state (on a wide-angle side) of the lens apparatus 1. The lower part of FIG. 2 is a sectional view illustrating the positions of the lens units in a tele state (on a telescopic side) of the lens apparatus 1. Movement of the lens units will be described next.

As described above, the first lens unit 100 moves straight in the optical axis direction when the manual zoom ring 5 is rotated to rotate the cam barrel 7.

The second lens unit 200 is fixed to the object-side end of the guide barrel 6 by a second lens cam follower (not illustrated). The second lens unit 200 is thereby configured to remain unchanged in the optical axis direction, whether in the wide state or the tele state.

The movement of the third, fourth, fifth, and sixth lens units 300, 400, 500, and 600 will be described. The third lens unit 300 moves differently from the sixth lens unit 600 in a zoom operation. The fourth lens unit 400 is fixed to the sixth lens unit 600 and moves in the same way as the sixth lens unit 600 in the optical axis direction. The fifth lens unit 500 is driven in the optical axis direction with respect to the sixth lens unit 600 by the actuator (not illustrated) disposed on the sixth lens unit 600. The third, fourth, fifth, and sixth lens units 300, 400, 500, and 600 are disposed inside the guide barrel 6.

<Configuration of Apparatus>

Figure 3:
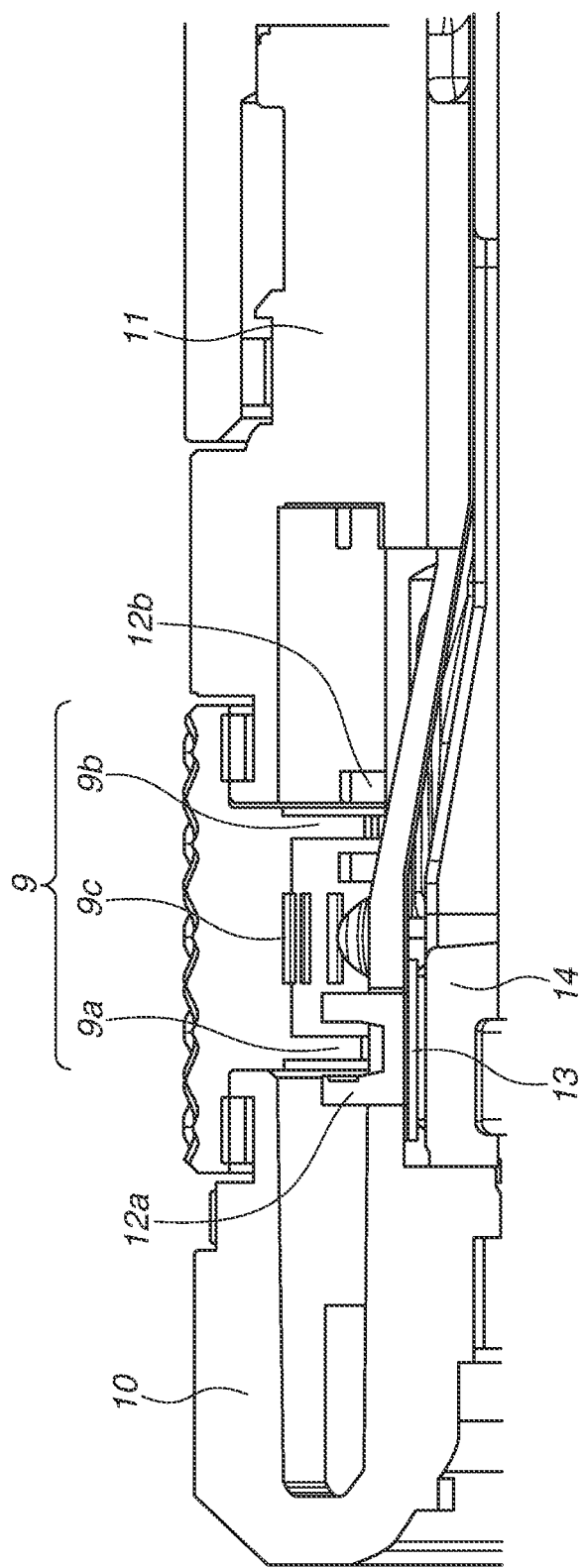
FIG. 3 is a sectional view illustrating a configuration of an operation ring according to a first exemplary embodiment of the subject disclosure.
Figure 4:
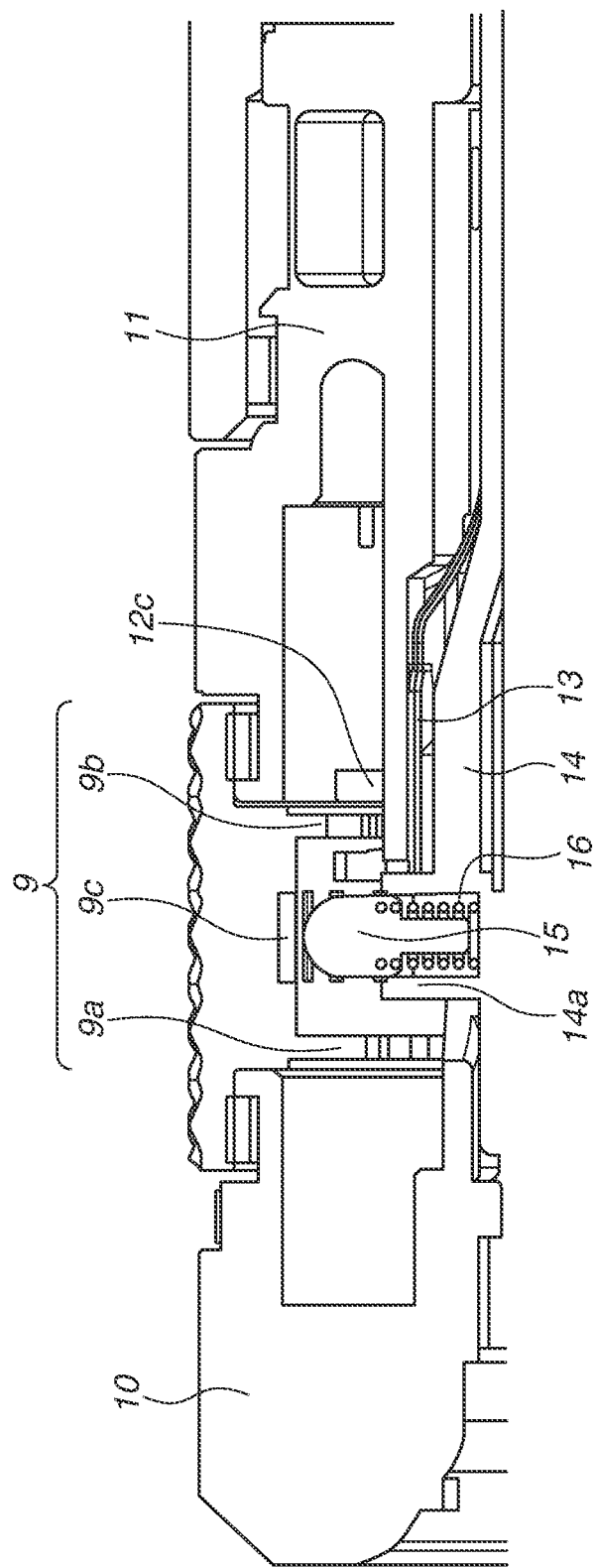
FIG. 4 is another sectional view illustrating the configuration of the operation ring according to the first exemplary embodiment of the subject disclosure.
Figure 5:
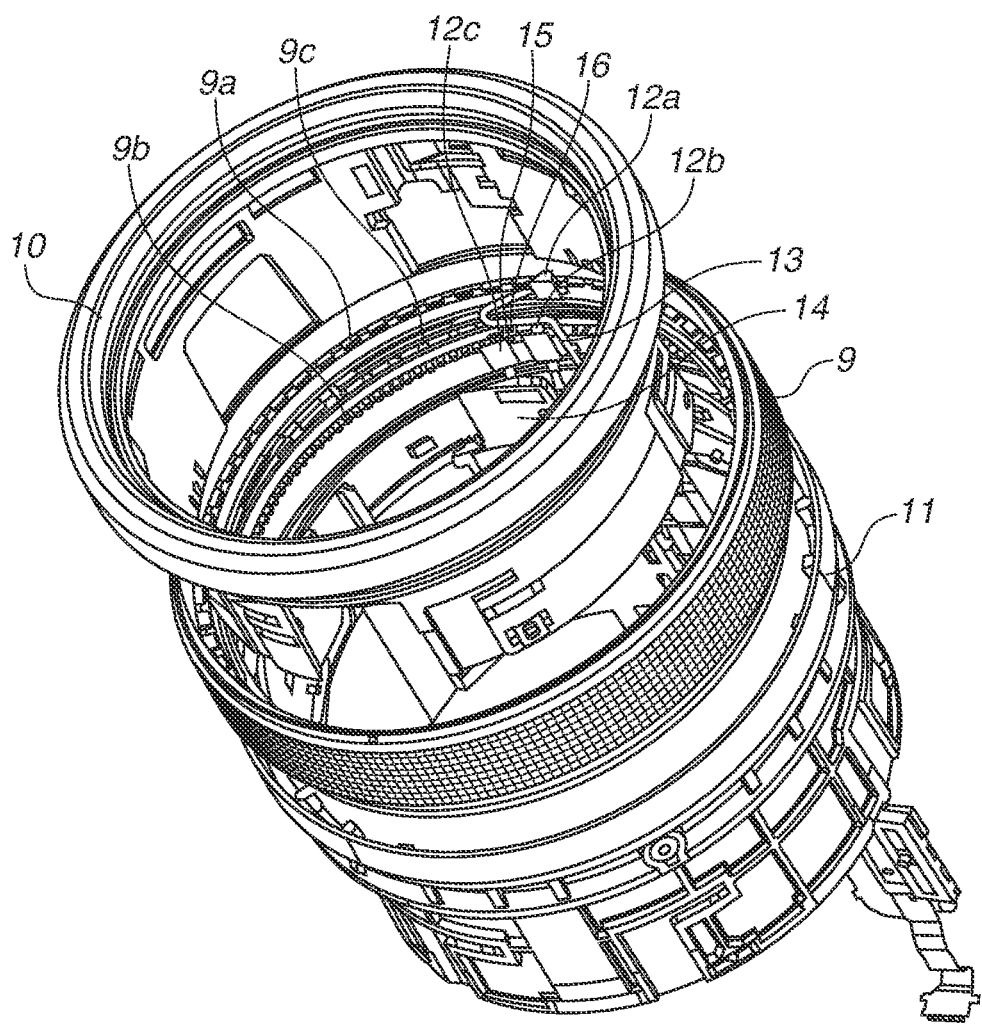
FIG. 5 is an exploded perspective view illustrating the configuration of the operation ring according to the first exemplary embodiment of the subject disclosure.

Next, a configuration of the apparatus included in the lens apparatus 1 will be descried. FIG. 3 is a sectional view illustrating the configuration of the operation ring 9. FIG. 4 is another sectional view illustrating the configuration of the operation ring 9. FIG. 4 illustrates a section in a different phase from that in FIG. 3. FIG. 5 is an exploded perspective view illustrating the configuration of the operation ring 9.

The operation ring 9 is sandwiched between a front frame 10 and a fixed barrel 11 in the optical axis direction, restricted in movement in the optical axis direction, and radially fitted to the front frame 10. The operation ring 9 includes a first tooth portion 9a and a second tooth portion 9b of flange shapes on the inner periphery. The first and second tooth portions 9a and 9b are circumferentially periodically slitted at respective different periods. The operation ring 9 is a component formed by injection molding using resin. While the operation ring 9 is described to include the integrally formed first and second tooth portions 9a and 9b, the first tooth portion 9a, the second tooth portion 9b, and click grooves 9c may be formed as separate members.

The apparatus included in the lens apparatus 1 includes a photointerrupter 12a (a first detection unit) for detecting the periodic slits in the first tooth portion 9a. The photointerrupter 12a includes a light emitting portion and a light receiving portion. The direction from the light emitting portion to the light receiving portion (The axis connecting the light emitting portion and the light receiving portion) is parallel to the rotation axis of the operation ring 9 (the optical axis of the lens unit 1). Light shielding portions and the slits in the first tooth portion 9a slitted at a first period pass alternately between the light emitting portion and the light receiving portion of the photointerrupter 12a. The photointerrupter 12a is fixed to a fixed member, and the light emitting portion emits light along the rotation axis of the operation ring 9 toward the first tooth portion 9a. The light receiving portion receives light having passed through the slits arranged in the first tooth portion 9a.

The apparatus included in the lens apparatus 1 further includes a photointerrupter 12b and a photointerrupter 12c (second detection units) for detecting the periodical slits in the second tooth portion 9b. The photointerrupters 12b and 12c each also include a light emitting portion and a light receiving portion. The direction from the light emitting portion to the light receiving portion (The axis connecting the light emitting portion and the light receiving portion) is parallel to the optical axis of the lens apparatus 1. Light shielding portions and the slits in the second tooth portion 9b slitted at a second period pass alternately between the light emitting portion and the light receiving portion of the photointerrupter 12b (the photointerrupter 12c). The photointerrupters 12b and 12c are fixed to the fixed member, and the light emitting portions emit light along the optical axis of the operation ring 9 toward the second tooth portion 9b. The light receiving portions receive light having passed through the slits arranged in the second tooth portion 9b. The photointerrupters 12b and 12c are spaced at a predetermined distance from each other in the circumferential direction of the operation ring 9 so that signals for detecting the amount and direction of rotation of the operation ring 9 are generated.

The photointerrupters 12a, 12b, and 12c are mounted on a flexible substrate 13. The flexible substrate 13 electrically connected with the photointerrupters 12a, 12b, and 12c is connected to the main CPU 8. A flexible holding member 14 is fixed from inside the front frame 10 and the fixed barrel 11, whereby the position of the flexible substrate 13 in the height direction (the radial direction) is fixed. The main CPU 8 can determine the rotation of the operation ring 9 based on the results of detection by the photointerrupter 12a (the first detection unit) and the photointerrupters 12b and 12c (the second detection units). The main CPU 8 can further determine the amount of rotation of the operation ring 9 using one of the types of detection units, and detect the rotation of the operation ring 9 using the other type for the purpose of synchronization with a click mechanism to be described below.

The flexible holding member 14 holds a click pin 15 (a sliding member) and a compression coil spring 16 with a click pin holding portion 14a (a click holding portion). The click pin 15 is made of metal and has a circular conical surface protruding in a radial direction (radially) from the center of the optical axis of the lens apparatus 1. The click pin holding portion 14a (the click holding portion) thus holding the click mechanism (the click pin 15 and the compression coil spring 16) in an elastically deformable manner is disposed on the fixed member. The click grooves 9c are circumferentially periodically provided in the inner periphery of the operation ring 9 at a position between the first tooth portion 9a and the second tooth portion 9b in the optical axis direction (the direction along the rotation axis of the operation ring 9). The click grooves 9c are recesses formed at the first period in the circumferential direction of the operation ring 9. Slopes of the click grooves 9c engage with the circular conical surface of the click pin 15 to periodically give a click feel when the operation ring 9 is rotated about the optical axis.

Figure 6:
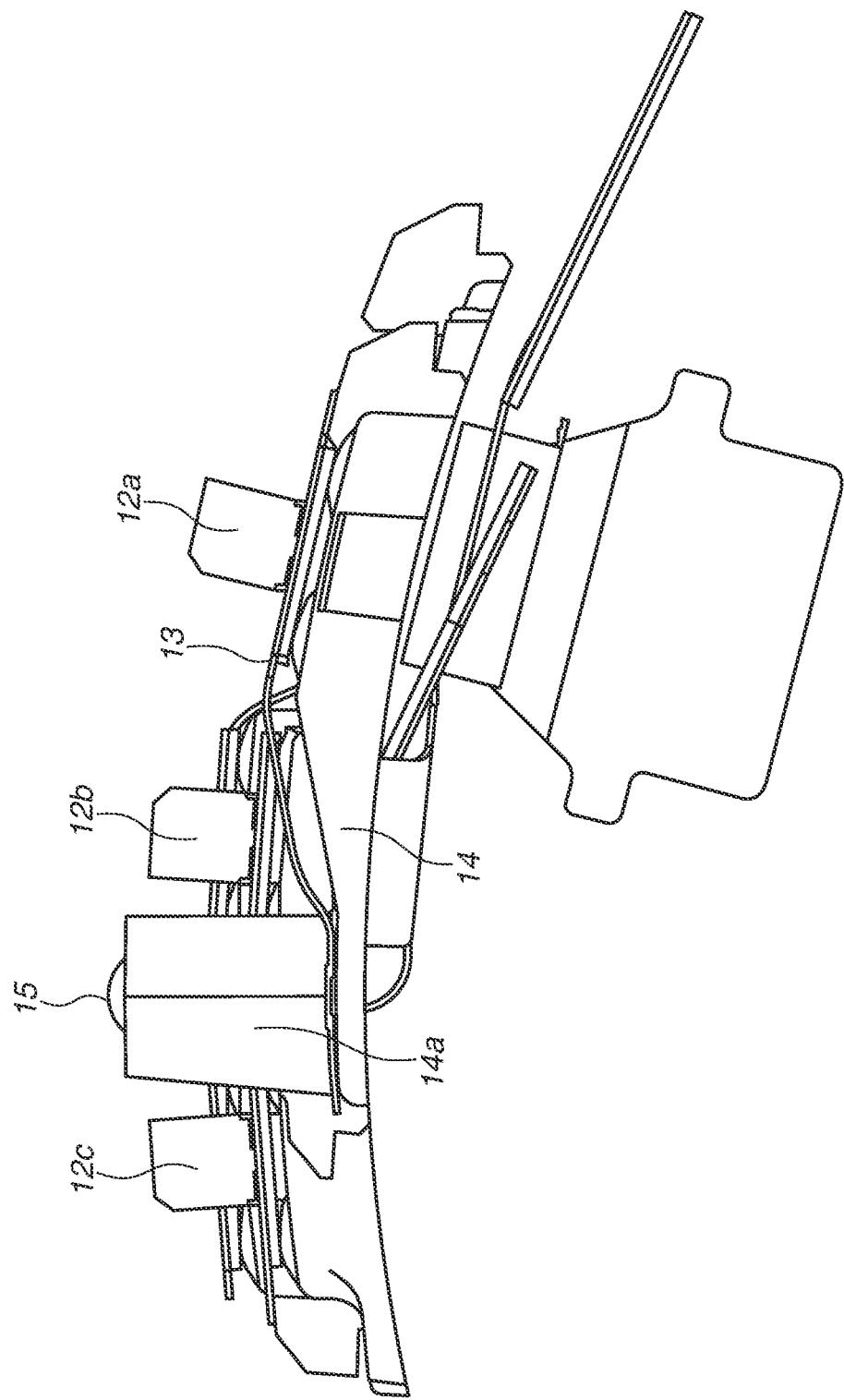
FIG. 6 is a front view of a flexible substrate and a flexible holding member seen from an object side, according to one or more embodiment of the subject disclosure.

FIG. 6 is a front view of the flexible substrate 13 and the flexible holding member 14 seen from the object side. As illustrated in FIG. 4, the photointerrupter 12c for detecting the rotation of the second tooth portion 9b provided on the inner periphery of the operation ring 9 partially overlaps the click pin holding portion 14a provided on the flexible holding member 14 serving as the fixed member, in the optical axis direction. Similarly, the photointerrupter 12b for detecting the rotation of the second tooth portion 9b partially overlaps the click pin holding portion 14a provided on the flexible holding member 14 serving as the fixed member, in the optical axis direction. Further, the photointerrupter 12a for detecting the rotation of the first tooth portion 9a partially overlaps the click pin holding portion 14a provided on the flexible holding member 14 serving as the fixed member, in the optical axis direction.

As illustrated in FIG. 6, the photointerrupters 12b and 12c and the click pin holding portion 14a are disposed in circumferentially different phases. The photointerrupters 12b and 12c and the click pin holding portion 14a can thus be disposed to overlap in the optical axis direction as long as the movement of the second tooth portion 9b is not affected. Similarly, the photointerrupter 12a and the click pin holding portion 14a are disposed in circumferentially different phases. The photointerrupter 12a and the click pin holding portion 14a can thus be disposed to overlap in the optical axis direction as long as the movement of the first tooth portion 9a is not affected.

Figure 7:
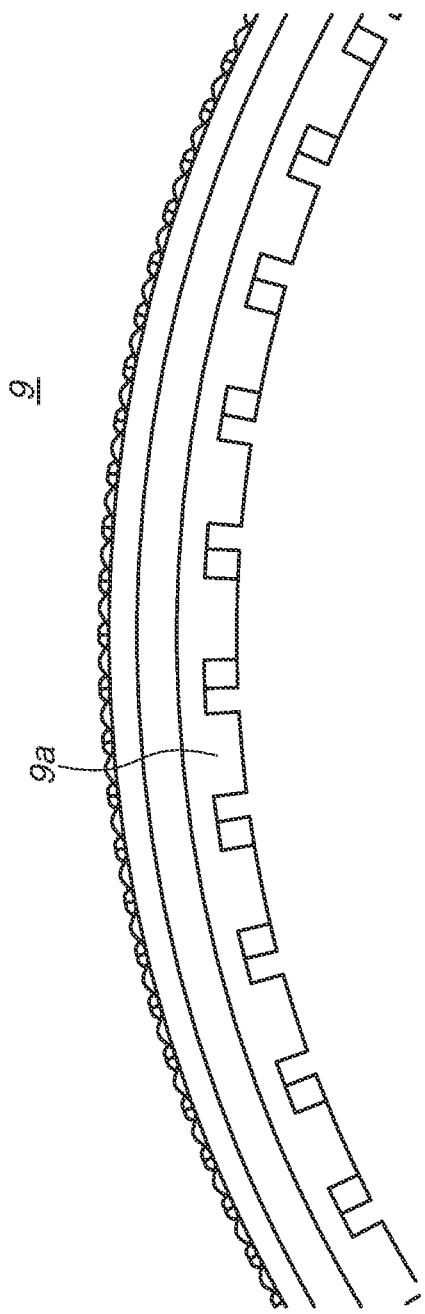
FIG. 7 is a view of a tooth pattern of the operation ring seen from the object side, according to one or more embodiment of the subject disclosure.
Figure 8:
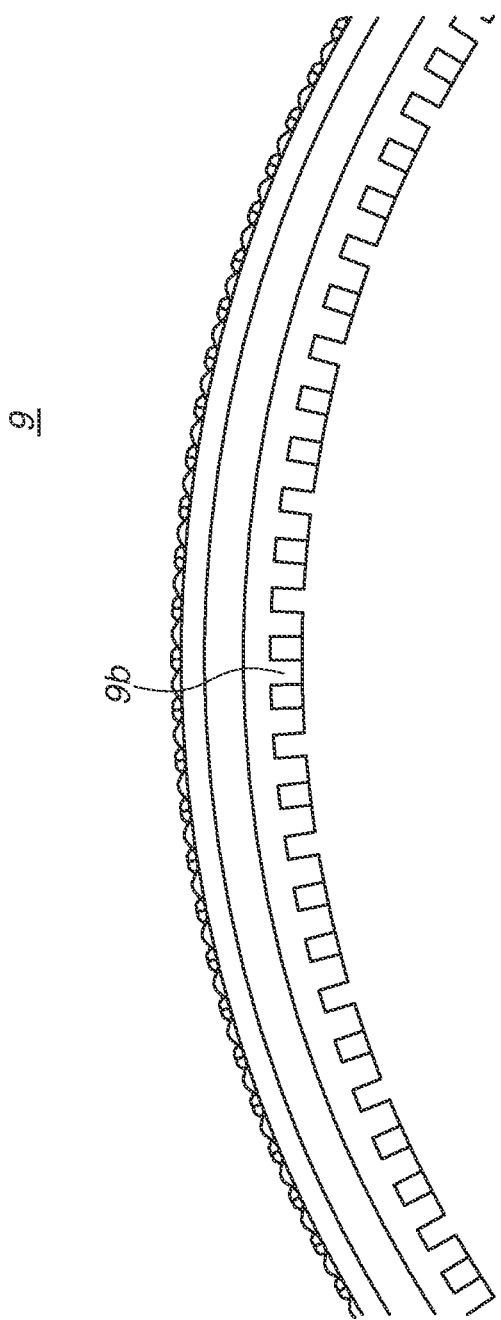
FIG. 8 is a view of the tooth pattern of the operation ring seen from an imaging side, according to one or more embodiment of the subject disclosure.

FIG. 7 is a front view of the operation ring 9 seen from the object side, and is a detailed view of the first tooth portion 9a seen from the object side in particular. FIG. 8 is a rear view of the operation ring 9 seen from the imaging side, and is a detailed view of the second tooth portion 9b seen from the imaging side in particular. FIG. 9 is a sectional view of the operation ring 9 taken at the position of the click grooves 9c, and is a view of the section seen from the imaging side.

The first period of the slits (or the light shielding portions) arranged in the first tooth portion 9a is the same as the period of the click grooves 9c. On the other hand, the first period of the slits (or the light shield portions) arranged in the first tooth portion 9a and the second period of the slits (or the light shield portions) arranged in the second tooth portion 9b are different from each other.

As described above, the click grooves 9c that can engage with the click pin 15 protruding in the radial direction from the center of the optical axis are disposed in the inner periphery of the operation ring 9 between the first and second tooth portions 9a and 9b in the optical axis direction. The operation ring 9 is a mechanism capable of endless rotation at a fixed position. The operation ring 9 thus integrally including the first tooth portion 9a, the second tooth portion 9b, and the click grooves 9c can be radially reduced in size. The lens apparatus 1 including the operation ring 9 can thus be reduced in size.

Optical apparatuses such as a camera and an interchangeable lens have a function of detecting the rotation of an operation ring and performing various operations. Some of such operation rings are capable of endless rotation (capable of rotation over the entire circumference without an end), and the present exemplary embodiment provides an apparatus for detecting the rotation of such an operation ring. Optical apparatuses including a click mechanism for giving a click feel at predetermined rotation angles even for such an endlessly rotatable operation ring have been known.

At least one of the plurality of photointerrupters 12a, 12b, and 12c included in the apparatus and the click pin holding portion 14a can be disposed to overlap each other in the optical axis direction. The space used for the photointerrupters serving as the detection units for detecting the rotation of the operation ring 9 and the click mechanism can thus be reduced in size in the optical axis direction. As a result, the lens apparatus 1 including the apparatus according to the present exemplary embodiment can be reduced in size.

<Other Configurations>

In the present exemplary embodiment, the click pin 15 and the compression coil spring 16 are described to be held by the click pin holding portion 14a formed on the flexible holding member 14. It will be understood, however, that the foregoing description also applies to a case where the click pin 15 and the compression coil spring 16 are held by other fixed members. The fixed member can be fixed against the rotating operation of the operation ring 9, and is not limited to the flexible holding member 14 or the click pin holding portion 14a formed thereon.

In the present exemplary embodiment, the click pin 15 is described to be made of metal and have a circular conical surface. However, this is not restrictive. For example, a rolling ball or a hemispherically drawn portion of a plate spring may be used. In the present exemplary embodiment, the compression coil spring 16 is described as an example of an elastic member. However, this is not restrictive. For example, a plate spring may be slid as the elastic member.

In the present exemplary embodiment, the example where the click pin 15 and the click pin holding portion 14a are shaped to protrude radially inward from the first tooth portion 9a or the second tooth portion 9b has been described. Alternatively, a plate spring can be used for low profile configuration. Further alternatively, the click pin 15 and the click pin holding portion 14a can be disposed at radially the same height as the photointerrupters 12a, 12b, and 12c. For a more stable operation feel, a biasing unit (not illustrated) for biasing the operation ring 9 in the optical axis direction can be disposed between an end face of the operation ring 9 in the optical axis direction and the front frame 10 or the fixed barrel 11.

<Configuration of Apparatus>

Next, a configuration of an apparatus according to a second exemplary embodiment will be described with reference to FIG. 10. A description of similarities to the first exemplary embodiment will be omitted, and differences from the first exemplary embodiment will mainly be described. FIG. 10 is a sectional view illustrating a configuration of the operation ring 9 according to the present exemplary embodiment.

As illustrated in FIG. 10, the photointerrupter 12a for detecting the rotation of the first tooth portion 9a provided on the inner periphery of the operation ring 9 and the photointerrupter 12b for detecting the rotation of the second tooth portion 9b partially overlap each other in the optical axis direction. Similarly, the photointerrupter 12a and the photointerrupter 12c (not illustrated) for detecting the rotation of the second tooth portion 9b also partially overlap each other in the optical axis direction.

Similarly to the first exemplary embodiment, the click grooves 9c are circumferentially periodically provided in the inner periphery of the operation ring 9 at a position between the first tooth portion 9a and the second tooth portion 9b in the optical axis direction. The click pin holding portion 14a is disposed in a phase circumferentially different from where the photointerrupters 12a, 12b, and 12c are, and at a position where the movement of the first and second tooth portions 9a and 9b is not affected. Similarly to the first exemplary embodiment, the photointerrupter 12c is also disposed in a phase circumferentially different from where the photointerrupter 12b is.

In the present exemplary embodiment, since the plurality of photointerrupters 12a, 12b, and 12c and the click pin holding portion 14a are disposed in phases circumferentially different from each other, the distance between the first and second tooth portions 9a and 9b in the optical axis direction can be reduced. In the present exemplary embodiment, the space used for the rotation detection and the click mechanism in the optical axis direction can thus be reduced as compared to the first exemplary embodiment. The lens apparatus 1 can thus be further reduced in size.

According to the exemplary embodiments of the present disclosure, the apparatus including the operation ring provided with the click mechanism can be reduced in size, and the lens apparatus can also be reduced in size. While the exemplary embodiments of the present disclosure have been described above, the present disclosure is not limited to these exemplary embodiments, and various modifications and changes can be made without departing from the gist thereof.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-167598, filed Oct. 12, 2021, which is hereby incorporated by reference herein in its entirety.

What is claimed is:

1. An apparatus comprising:
an operation ring including a first tooth portion where light shielding portions and slits are both arranged at a first period and a second tooth portion where light shielding portions and slits are both arranged at a second period different from the first period;
a first detection unit including a light emitting portion configured to emit light to the first tooth portion and a light receiving portion configured to receive light emitted from the light emitting portion and having passed through the slits of the first tooth portion; and
a second detection unit including a light emitting portion configured to emit light to the second tooth portion and a light receiving portion configured to receive light emitted from the light emitting portion and having passed through the slits of the second tooth portion,
wherein rotation of the operation ring is detected based on a result of detection by the first detection unit and a result of detection by the second detection unit,
wherein the operation ring has grooves formed at the first period in a circumferential direction of the operation ring, and the grooves are formed between the first tooth portion and the second tooth portion in a direction parallel to a rotation axis of the operation ring, and
wherein the apparatus further comprises a sliding member configured to be biased in a radial direction of the operation ring and slide over the grooves as the operation ring rotates.

2. The apparatus according to claim 1, wherein the grooves are formed at a position at least partially overlapping the first detection unit and the second detection unit in the direction parallel to the rotation axis.

3. The apparatus according to claim 1, wherein the sliding member is disposed at a position at least partially overlapping the first detection unit and the second detection unit in the direction parallel to the rotation axis.

4. The apparatus according to claim 1, wherein at least a part of the first detection unit is disposed at a position overlapping at least a part of the second detection unit in the direction parallel to the rotation axis.

5. The apparatus according to claim 1, wherein the sliding member, the first detection unit, and the second detection unit are disposed at positions not overlapping each other in the circumferential direction.

6. The apparatus according to claim 1, wherein a rotation amount of the operation ring is detected based on the result of the detection by the second detection unit.

7. The apparatus according to claim 1, further comprising an optical element.

8. The apparatus according to claim 1, further comprising an image sensor.

9. The apparatus according to claim 7, further comprising a control unit configured to control the optical element based on a rotation amount of the operation ring.

* * * * *